United States Patent [19]
Saito et al.

[11] Patent Number: 4,716,851
[45] Date of Patent: Jan. 5, 1988

[54] CURVED SURFACE SHAPING APPARATUS AND CURVED SURFACE SHAPING METHOD USING THE SAME

[75] Inventors: Kenji Saito, Tokyo; Noritaka Mochizuki, Yokohama; Yukuo Nishimura, Sagamihara, all of Japan

[73] Assignee: Canon Kabushiki Kaisha, Tokyo, Japan

[21] Appl. No.: 760,549

[22] Filed: Jul. 30, 1985

[30] Foreign Application Priority Data

| Aug. 6, 1984 | [JP] | Japan | 59-163854 |
| Aug. 6, 1984 | [JP] | Japan | 59-163855 |
| Aug. 6, 1984 | [JP] | Japan | 59-163856 |
| Aug. 6, 1984 | [JP] | Japan | 59-163857 |
| Aug. 6, 1984 | [JP] | Japan | 59-163858 |

[51] Int. Cl.$^4$ ............................................. B05C 3/12
[52] U.S. Cl. ...................................... 118/402; 264/1.4; 425/808; 427/434.3
[58] Field of Search ............... 118/402, 403; 264/1.4, 264/1.7, 298; 425/808, 445; 427/434.3

[56] References Cited

U.S. PATENT DOCUMENTS

| 4,010,020 | 3/1977 | Wyden | 425/808 X |
| 4,224,896 | 9/1980 | Barraud et al. | 118/402 |
| 4,511,604 | 4/1985 | Barraud et al. | 427/434.3 X |
| 4,534,915 | 8/1985 | Neefe | 264/1.4 |

FOREIGN PATENT DOCUMENTS

0051027  5/1982  European Pat. Off.

*Primary Examiner*—Charles Hart
*Attorney, Agent, or Firm*—Fitzpatrick, Cella, Harper & Scinto

[57] ABSTRACT

A curved surface shaping apparatus has a liquid tank for developing a monomolecular film on the surface of liquid contained in the liquid tank, a jig for holding a base member to be shaped, and moving means for moving the base member held by the jig with the shaped surface of the base member intersecting the liquid surface. A curved surface shaping method comprises a step of moving a base member to be shaped relative to a liquid surface on which a monomolecular film is formed, with the liquid surface and the shaped surface of the base member intersecting each other.

5 Claims, 18 Drawing Figures

CURVED SURFACE SHAPING APPARATUS AND CURVED SURFACE SHAPING METHOD USING THE SAME

BACKGROUND OF THE INVENTION

1. Field of the Invention

This invention relates to a curved surface shaping apparatus utilized for the shaping of various curved surfaces, which require high accuracy, such as optical curved surfaces in lenses, mirrors, light-receiving elements, light-emitting elements, etc., and to a curved surface shaping method using the same.

2. Description of the Prior Art

Generally, when a curved surface is to be obtained, it is very difficult to shape it highly accurately if the curved surface is a spherical surface, and this is particularly so if the curved surface is a non-spherical surface.

Heretofore, the curved surface of a non-spherical lens in which correction of lens aberrations is desired has been shaped by (1) the cutting of a spherical lens by a cutter, (2) the casting into a mold in which a desired non-spherical surface is formed or (3) the deposition onto a spherical lens.

However, in the case of the method mentioned under item (1) above, unevenness corresponding to the manner in which the cutter is applied to the surface is created on the shaped surface and therefore the surface must be polished after the cutting, and this makes deviation with respect to the desired curvature unavoidable. In the case of the method mentioned under item (2) above, not only the accuracy of the curved surface itself of the mold possibly poses a problem, but also the casting and cooling of a hot material (molten glass) poses problems of distortion attributable to non-uniform cooling and the heterogeneity of the surface which is in contact with the mold. In the case of the method mentioned under item (3) above, not only is it difficult to uniformly effect the deposition onto the curved surface, but also the deposition must be effected while the coverage by masking is gradually moved in accordance with the desired curvature, and this leads to cumbersomeness of the operation and the possbility of error.

Thus, it is very difficult to shape a desired curved surface highly accurately, and particularly in the case of shaping a non-spherical surface a considerable degree of error unavoidably occurs.

SUMMARY OF THE INVENTION

The present invention intends to solve a problem in shaping a curved surface highly accurately even if it is a non-spherical surface.

That is, the present invention is a curved surface shaping apparatus characterized by a liquid tank for developing a monomolecular film on the surface of liquid contained in said liquid tank, a jig for holding a base member to be shaped, and moving means for moving said base member held by said jig with the shaped surface of said base member intersecting said liquid surface.

Further, the present invention is a curved surface shaping method characterized by moving a base member to be shaped relative to a liquid surface on which a monomolecular film is formed, with said liquid surface and the shaped surface of said base member intersecting each other.

DESCRIPTION OF THE PREFERRED EMBODIMENTS

In the present invention, a conventional film forming apparatus can suitably be utilized and a monomolecular film formed thereby refers to a super-thin film of a uniform thickness in which a molecule is located next to its neighbors in a planar manner. The base member is an object which is to shape into a curved surface and is chiefly an optical system member such as a lens, a mirror, a light-receiving element or a light-emitting element, but if may be some other member. Also, the state in which the shaped surface of the base member interects the liquid surface in the liquid tank of the film forming apparatus refers to a state in which a part of the shaped surface of the base member sinks below the liquid surface and at the same time a part of the shaped surface is exposed above the liquid surface.

When the base member is moved by a driving unit, a predetermined range of the shaped surface of the base member moves up and down in accordance with the amplitude of said movement of the base member with the liquid surface being as the boundary. On the other hand, if a monomolecular film is preformed on the liquid surface, this monomolecular film is built up to be folded on the shaped surface of the base member moving up and down in accordance with said movement of the base member with the liquid surface being the boundary. It is known as the monomolecular built-up method (the Langmuir-Blodgett's Technique) that a monomolecular film can be transferred onto a smooth surface and it can be built up, and in the present invention, this is utilized for shaping a curved surface. Particularly in the present invention, the base member is moved while the shaped surface of the base member and the liquid surface intersect each other, whereby the built-up range of the monomolecular films can be adjusted by the amount of movement of the base member. By causing the monomolecular films to be built-up while adjusting the built-up range and the built-up number of the monomolecular films by the amount and frequency of movement of the base member, the state of the curved surface may be regulated to an angstrom order of the monomolecular film having a uniform thickness corresponding to a molecular, and a curved surface can be shaped highly accurately.

Figure 1:
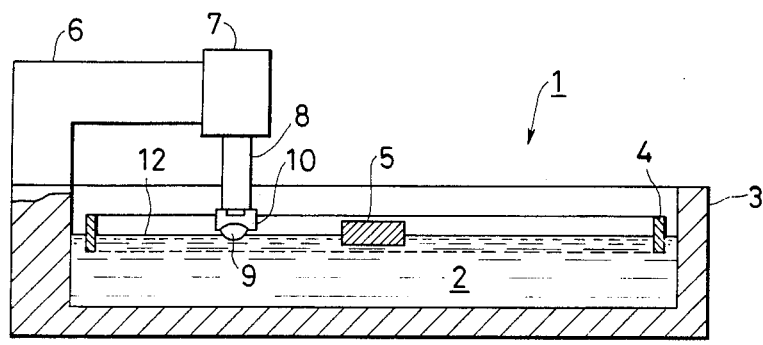
FIG. 1 is a schematic view of an embodiment of the present invention.

Referring to FIG. 1, a film forming apparatus 1 is constructed such that within a liquid tank 3 containing a liquid 2 therein, an inner frame 4 formed of a material such as polypropylene to which a monomolecular film may hardly adhere is suspended horizontally and within this inner frame 4, a film forming frame 5 also formed of such a material to which a monomolecular film may hardly adhere is set afloat. The film forming frame 5 is a rectangular solid whose width is slightly shorter than the inner width of the inner frame 4, and is movable left and right as viewed in FIG. 1.

A driving unit 7 mounted on a supporting portion 6 is positioned above the left portion of the liquid tank 3 as viewed in FIG. 1. A support shaft 8 depends from the driving unit 7, and a jig 10 for holding a base member 9 is mounted on the lower end of the support shaft.

Figure 2A:
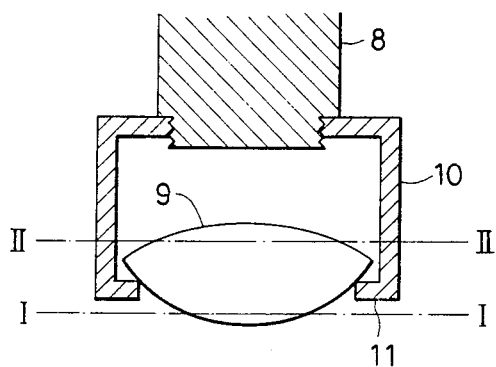
FIGS. 2(a) and 2(b) are an enlarged longitudinal cross-sectional view and an enlarged bottom plan view, respectively, of the jig in the embodiment of FIG. 1.
Figure 2B:
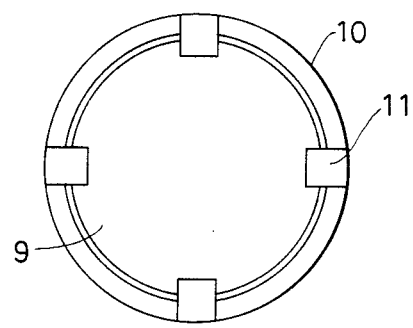
Figure 3:
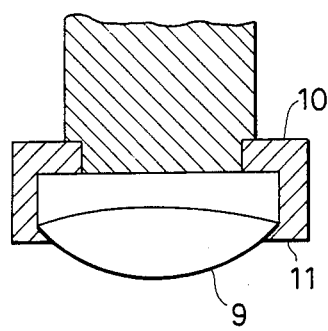
FIGS. 3 and 4 are longitudinal cross-sectional views showing further examples of the jig.
Figure 4:
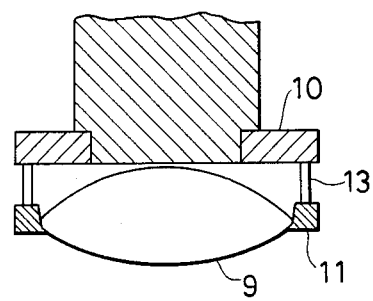

As shown in FIG. 2, the jig 10 is threadably mounted on the lower end of the support shaft 8 so that it can be interchanged in conformity with the base member 9. This jig 10 has pawls 11 at the four corners of the lower end thereof, and the base member 9 is held by the peripheral edge portion thereof being placed on the pawls 11. The pawls 11 of the jig 10 may be provided not only at the four corners shown in FIG. 2, but also over the entire periphery of the jig. Also, the pawls 11 may be made thin and short as shown in FIG. 3 so as to prevent interference thereof. Furthermore, if the pawls 11 are supported by pins 13 as shown in FIG. 4, the area over which the jig 10 cuts the liquid surface during the movement of the jig 10 by the driving unit 7, which will later be described, can be reduced and correspondingly, the disturbance of the monomolecular film on the liquid surface 12 can preferably be suppressed. If the pins 13 are outwardly bent, the position at which the jig 10 cuts the liquid surface 12 will become distant from the base member 9 and preferably, it will become difficult for the influence of the jig 10 upon the monomolecular film to be imparted to the base member 9.

On the other hand, the driving unit 7 shown in FIG. 1 causes the base member 9 held on the jig 10 as described above to be reciprocally moved rectilinearly up and down with the jig 10 through the support shaft 8 while the surface of the base, member 9 and the liquid surface 12 in the liquid tank 3 intersects each other. For example, where the lower surface of the base member 9 is to be shaped, the base member 9 is reciprocally moved up and down with the liquid surface 12 intersecting the lower surface of the base member 9 as indicated by line I—I in FIG. 2(a). Also, where the upper surface of the base member 9 is to be shaped, the base member 9 is reciprocally moved up and down with the liquid surface 12 intersecting the upper surface of the base member 9 as indicated by line II—II in FIG. 2(a). This movement of the base member 9 by the driving unit 7 is not limited to the vertical direction, but may also be in an oblique direction.

The liquid 2 contained in the liquid tank 3 is usually pure water. After the liquid surface 12 has been cleaned, the film forming frame 5 is displaced to the right as viewed in FIG. 1, and several drops of a solution of film constituting substance dissolved in a volatile solvent such as benzene or chloroform are dripped onto the liquid surface 12 by means of a dropping pipette or the like. The film constituting substance may usually be a substance consisting of a molecule having at least a hydrophobic group and a hydrophilic group in its chemical structure. Popular as the hydrophobic group is, for example, a long-chain alkyl group of carbon number 5–30, and popular as the hydrophilic group is, for example, a polar group such as a carboxyl group, an amino group, etc. As a specific example of the film constituting substance, arachidic acid or the like is available.

When the solution of said film constituting substance is dripped and developed on the liquid surface and the solvent volatilizes, a gaseous monomolecular film is left on the liquid surface. The film forming frame 5 is then moved to the left as viewed in FIG. 1 and, when the area of the liquid surface 12 on which the monomolecular film is developed is gradually reduced to increase the surface density, the interaction between the molecules strengthens and the monomolecular film assumes the state of a liquid film. When the monomolecular film has assumed the state of a solid film, the base member 90 is reciprocally moved up and down by the driving unit 7 as previously described and the monomolecular film is caused to stick and become built-up on the surface of the base member 9, whereby shaping of a curved surface is accomplished. The optimum state of the monomolecular film to be transferred to the base member 9 can be known with it as a formal standard that the surface pressure of the monomolecular film is 15–30 dyn/cm. As the monomolecular film sticks and builds up on the base member 9, the surface density of the monomolecular film molecule on the liquid surface 12 is reduced and the surface pressure is also reduced, and therefore, the transfer of the monomolecular film to the base member 9 is effected while the film forming frame 5 is gradually moved to maintain the surface pressure constant. The movement velocity of the base member 9 may preferably be 1 cm per minute or less so that the monomolecular film can reliably stick and build-up on the base member without being disturbed.

The process in which the monomolecular film is sticks and builds up on the base member 9 will now be described with reference to FIG. 5.

Figure 5A:
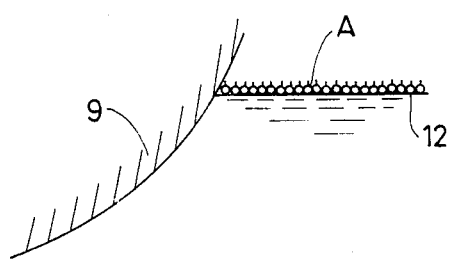
FIGS. 5(a)-5(d) illustrate process in which a monomolecular film sticks and builds-up on the base member.
Figure 5B:
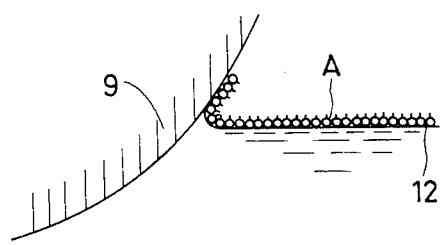
Figure 5C:
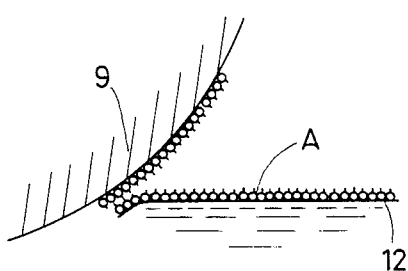
Figure 5D:
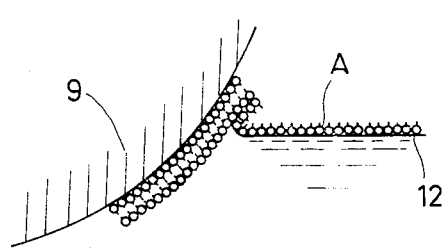
Figure 6:
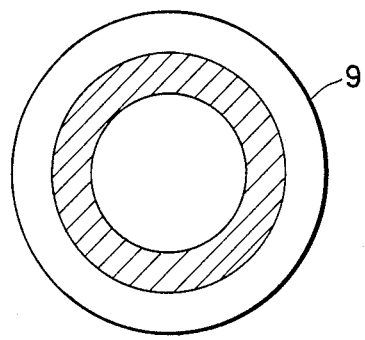
FIG. 6 shows the sticking and built-up range of the monomolecular film.

When the base member 9 is moved upwardly (or downwardly) with the shaped surface thereof intersecting the liquid surface 12 as shown in FIG. 5(a), a monomolecular film A sticks and is transferred to the surface of the base member 9 as shown in FIG. 5(b). After the base member 9 has been moved upwardly by a predetermined amount, the base member 9 is moved downwardly while the intersection between the shaped surface of the base member 9 and the liquid surface 12 is kept, whereupon as shown in FIG. 5(c), a monomolecular film A is superposed on the monomolecular film A previously on the surface of the base member 9, and by the upward and downward movement of the base member 9 being repeated, monomolecular films A are built-up to be folded on the surface of the base member 9 one after another as shown in FIG. 5(d).

Where the base member 9 is a spherical lens, monomolecular films are built up, in the manner described above, in the range as indicated by hatching in FIG. 6. The width of the monomolecular film built-up range formed in the form of a doughnut is determined by the amount of upward and downward movement of the base member 9, and the sticking thickness of the monomolecular film is determined by the number of sticking layers of the monomolecular film, i.e., the frequency of movement of the base member 9. Accordingly, if the monomolecular film that sticks and is built up on the surface while the amount and the frequency of movement of the base member 9 by the driving unit 7 (see FIG. 1) are adjusted, the monomolcular film built up on the surface may have an arbitrary thickness and sticking range. For example, the shaping of a spherical lens into a non-spherical lens can be accomplished easily.

If during the sticking and building up of the monomolecular film on the base member 9, the base member 9 is brought to the state of FIG. 5(*a*) after the monomolecular film has been formed on the liquid surface 12, a monomolecular film will stick to a portion to which the monomolecular film should not stick for example, the central portion of the base member 9 shown in FIG. 6. To prevent this, the base member 9 may be preset to a state in which the shaped surface thereof intersects the liquid surface 12 as shown in FIG. 5(*a*), whereafter the monomolecular film may be formed on the liquid surface 12. However, the monomolecular film is very thin and even if one or two layers of it stick to the surface of the base member, they are negligible in the curved surface and therefore, it is unnecessary to do this particularly. Also, if a substance such as diacetylenes which initiates a polymerizing reaction by ultraviolet irradiation is used as the film constituting substance and a monomolecular film is built up on the base member 9 in the manner previously described and thereafter it is polymerized, the sticking of the monomolecular film to the base member 9 will preferably become more rigid and stable.

The upward and downward movement of the base member 9 by the driving unit 7 in the present invention is not limited to the hitherto described rectilinear upward and downward reciprocal movement, but rotation about the center axis of the base member 9 may be added thereto or reciprocal tilting of the base member 9 may replace the rectilinear reciprocal movement.

In the case of only the hitherto described rectilinear upward and downward reciprocal movement, if the base member 9 is for example a spherical lens or the like, even if the base member 9 is moved at a predetermined velocity, the movement velocity of the portion of the surface of the base member 9 which intersects the liquid surface 12 varies because the shaped surface of the base member 9 is curved. Accordingly, the speed of transfer of the monomolecular film to the base member 9 varies depending on the position of the surface of the base member 9. In contrast, if the base member 9 is rotated about its vertical axis simultaneously with its upward and downward rectilinear reciprocal movement, the monomolecular film will be spirally wound on the surface of the base member 9 and, by maintaining the velocity component of the upward and downward movement velocity and the rotational velocity constant, the speed of transfer of the monomolecular film to the base member 9 can be kept constant. This in turn leads to an advantage that it is easy to make the property of the monomolecular film that sticks and is built up on the base member 9 uniform.

Figure 7A:
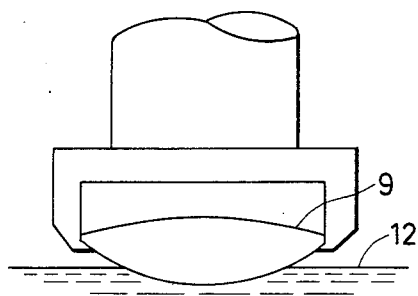
FIGS. 7(a)-7(c) show a state in which a base member is tilted.
Figure 7B:
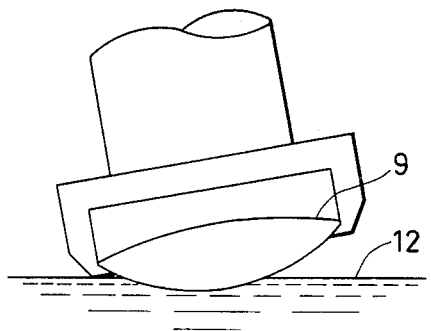
Figure 7C:
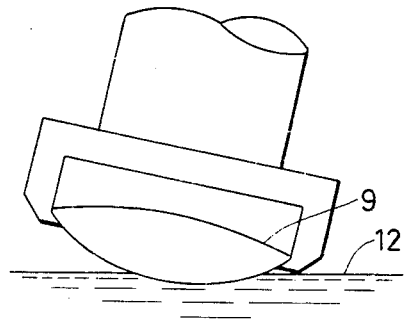
Figure 8:
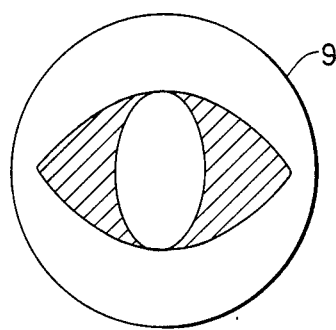
FIG. 8 shows the sticking and built-up range of the monomolecular films.

On the other hand, if as shown in FIG. 7, the base member 9 is reciprocally tilted with the surface thereof intersecting the liquid surface 12 and thereby the base member 9 is reciprocally moved up and down, where the base member 9 is for example a spherical lens, the monommolecular film will stick and be built up on the range as indicated by hatching in FIG. 8. The lateral width of this monomolecular film range shown in FIG. 8 can be adjusted by the amount of tilt of the base member 9, and the sticking thickness of the monomolecular film can be adjusted by the frequency of tilt reciprocation of the base member 9. If the monomolecular film that sticks and is built up on the surface by such reciprocal tilting of the base member 9, a rotation-asymmetrical non-spherical lens such as a double-focus lens or the like can be easily obtained by this shaping. If the aforementioned rectilinear upward and downward reciprocal movement or rotation is continuously or intermittently added to this tilting, the sticking and built-up state of the monomolecular film can be adjusted more delicately. Where the base member 9 is a lens, the center of tilting of the base member 9 is usually selected on the optic axis thereof, but asymmetrical shaping can also be accomplished by selecting the center of tilting off the optic axis.

Figure 9:
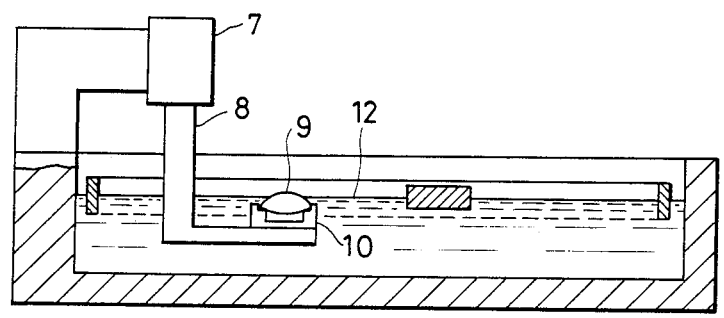
FIG. 9 is a schematic view of another embodiment of the present invention.
Figure 10:
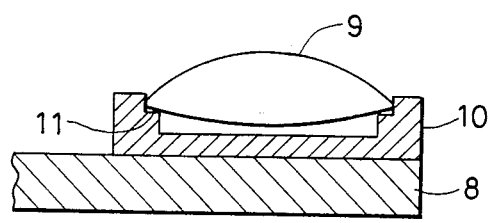
FIG. 10 is an enlarged longitudinal cross-sectional view of the jig in the embodiment of FIG. 9.

Referring now to FIG. 9 which shows another embodiment of the present invention, the support shaft 8 connected to the driving unit 7 extends to below the liquid surface 12, and the jig 10 is upwardly mounted on the end portion of the support shaft 8 which is below the liquid surface 12. As shown in FIG. 10, the base member 9 is held on this jig 10 by the base member 9 being placed on the pawls 11 of the jig. The present embodiment is similar to the previous embodiment with the exception that movement of the base member 9 is effected below the liquid surface 12, and may obtain an operational effect similar to that of the previous embodiment.

Figure 11:
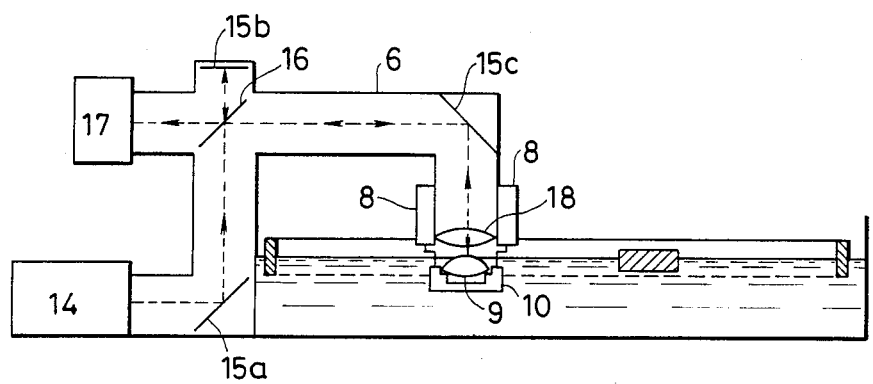
FIG. 11 is a schematic view of still another embodiment of the present invention.
Figure 12:
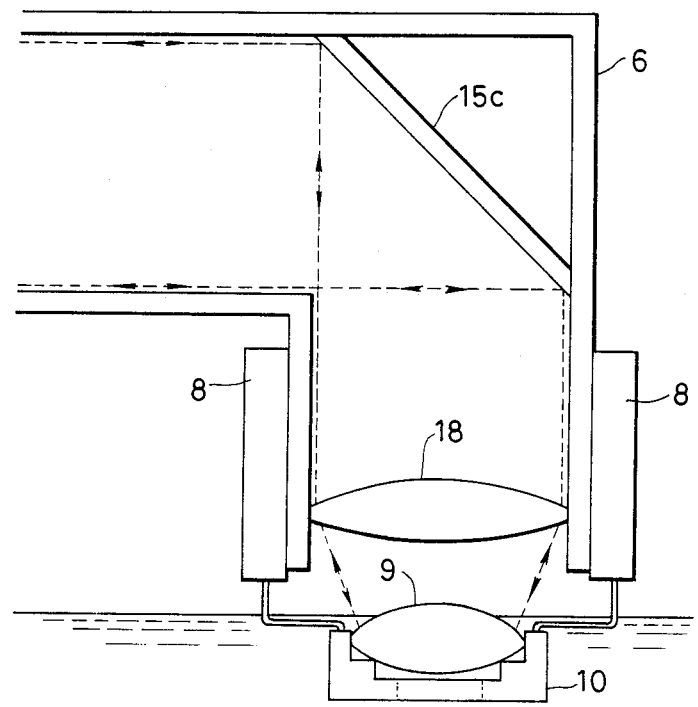
FIG. 12 is an enlarged view of the neighborhood of the base member in the embodiment of FIG. 11.

FIGS. 11 and 12 show still another embodiment in which shaping can be effected while the state of shaping the curved surface is monitored. A parallel light beam emitted from a collimated light source 14 travels in the direction of the arrow and is changed in its direction by a mirror 15*a*, whereafter it is divided into a reference light and a measuring light by a half-mirror 16. The reference light is again reflected toward the half-mirror 16 by a mirror 15*b*, is further reflected by the half-mirror 16 and is supplied to an interference fringe reading device 17. On the other hand, the measuring light is supplied to a mirror 15*c*, whereby it is reflected and is supplied to the surface of the base member 9 on the jig 10 through a reference lens 18. The measuring light reflected by the surface of the base member 9 again passes through the reference lens 18 and the mirror 15*c* and is supplied to the interference fringe reading device 17, and the state of the surface of the base member 9 is detected from the state of interference of the measuring light with the reference light. Accordingly, in conformity which the result of this detection, the base member 9 can be moved to cause a monomolecular film to stick and become built-up thereon and thus, the operation becomes accurate and efficient. The support shaft 8 in the present embodiment is moved up and down along a support portion 6 by the driving unit (not shown).

In the foregoing description, the reference light is formed by the half-mirror 16 and the mirror 15*b*, but alternatively, the reflected light from the reference lens 18 may be the reference light. Also, the detection of the state of the surface of the base member 9 is effected when the surface of the base member 9 to be detected is on the liquid surface 12, but this measuring position may be preset so that measurement may be automatically effected when the base member 9 is moved to said position. Also, from the result of this measurement, the movement of the base member 9 can be controlled by a computer or the like.

According to the present invention, a curved surface can be shaped by the sticking and building up of a super-thin film of the order of angstrom called a monomolecular film, and the sticking range and the number of built-up layers of the monomolecular film can be freely adjusted and therefore, a curved surface can be shaped highly accurately and shaping of a non-spherical surface can also be accomplished highly accurately.

We claim:

1. A curved surface shaping apparatus comprising:
   a liquid tank for developing a monomolecular film on a surface of a liquid contained therein;
   means for holding a base member to be shaped; and
   moving means for linearly reciprocally moving said base member and simultaneously rotating said base member about an axis of said base member in such a manner that a curved surface of said base member to be shaped intersects said liquid surface.

2. A curved surface shaping apparatus according to claim 1, wherein said moving means further reciprocally tilts said base member.

3. A curved surface shaping apparatus according to claim 1, further comprising monitor means for monitoring the state of said shaped curved surface.

4. A curved surface shaping apparatus according to claim 3, wherein said monitoring means monitors interference fringes of a reference light and a measuring light divided from collimated light emitted by a collimated light source.

5. A curved surface shaping apparatus according to claim 1, wherein said base member is supported by a jig having pawls and pins respectively supporting said pawls.

* * * * *